US012022871B2

(12) United States Patent
Kalaydzhyan

(10) Patent No.: US 12,022,871 B2
(45) Date of Patent: Jul. 2, 2024

(54) AEROSOL GENERATOR

(71) Applicant: Karen Kalaydzhyan, Moscow (RU)

(72) Inventor: Karen Kalaydzhyan, Moscow (RU)

( * ) Notice: Subject to any disclaimer, the term of this patent is extended or adjusted under 35 U.S.C. 154(b) by 759 days.

(21) Appl. No.: 17/053,999

(22) PCT Filed: Jun. 5, 2019

(86) PCT No.: PCT/IB2019/054655
§ 371 (c)(1),
(2) Date: Nov. 9, 2020

(87) PCT Pub. No.: WO2019/239252
PCT Pub. Date: Dec. 19, 2019

(65) Prior Publication Data

US 2021/0112871 A1 Apr. 22, 2021

Related U.S. Application Data

(60) Provisional application No. 62/683,991, filed on Jun. 12, 2018.

(51) Int. Cl.
*A24F 40/46* (2020.01)
*A24F 40/42* (2020.01)
(Continued)

(52) U.S. Cl.
CPC .............. *A24F 40/46* (2020.01); *A24F 40/42* (2020.01); *A24F 40/485* (2020.01); *A24F 40/51* (2020.01);
(Continued)

(58) Field of Classification Search
CPC ........ A24F 40/46; A24F 40/485; A24F 40/57; A24F 40/42; A24F 40/51; A24F 40/10;
(Continued)

(56) References Cited

U.S. PATENT DOCUMENTS 9,980,518 B1 5/2018 Most
9,986,760 B2 * 6/2018 Macko .................... A24F 40/46
(Continued)

FOREIGN PATENT DOCUMENTS

CN 106 263 037 A 1/2017
DE 102016120803 A1 5/2018
(Continued)

OTHER PUBLICATIONS

Dessaux, Christophe, International Search Report, Written Opinion of the International Searching Authority, dated Sep. 20, 2019, European Patent Office, Munich, Germany.

*Primary Examiner* — Peter G Leigh
(74) *Attorney, Agent, or Firm* — Ashkan Najafi

(57) ABSTRACT

An aerosol generator comprises: a reservoir configured to contain a liquid medium; a heating body comprising a plurality of channels and an electrically-conductive sheet, the sheet having a first surface and an opposite second surface; and an electric power unit configured to inject pulses of electric current through the sheet. The channels are disposed in the sheet and extending through the sheet from the first surface of the sheet to the opposite second surface of the sheet. The channels are configured for providing directional flow of a vapor from the channels. In some embodiments, the channels have variable width along the length. The sheet material includes heavily doped silicon. The electric power unit provides correlation of the pulse parameters with the thermal time constant of the heating body for pulsed operation of the heating body. The aerosol generator produces dense inhalable aerosol at reduced hazardous risks and is manufactured more standardized at a low cost.

16 Claims, 9 Drawing Sheets

(51) Int. Cl.

| | |
|---|---|
| ***A24F 40/485*** | (2020.01) |
| ***A24F 40/51*** | (2020.01) |
| ***A24F 40/57*** | (2020.01) |
| ***B05B 1/14*** | (2006.01) |
| ***B05B 7/16*** | (2006.01) |
| ***H05B 1/02*** | (2006.01) |
| ***H05B 3/14*** | (2006.01) |
| ***H05B 3/42*** | (2006.01) |
| *A24F 40/10* | (2020.01) |

(52) U.S. Cl.
CPC ................ *A24F 40/57* (2020.01); *B05B 1/14* (2013.01); *B05B 7/1686* (2013.01); *H05B 1/0244* (2013.01); *H05B 3/148* (2013.01); *H05B 3/42* (2013.01); *A24F 40/10* (2020.01); *H05B 2203/016* (2013.01); *H05B 2203/021* (2013.01)

(58) Field of Classification Search
CPC ....... B05B 1/14; B05B 7/1686; H05B 1/0244; H05B 3/48; H05B 3/42; H05B 2203/061; H05B 2203/021
USPC .......................................................... 131/328
See application file for complete search history.

(56) References Cited

U.S. PATENT DOCUMENTS

| | | | | |
|---|---|---|---|---|
| 2015/0027459 | A1* | 1/2015 | Collett .................... | A24F 40/46 392/386 |
| 2016/0338410 | A1 | 11/2016 | Batista et al. | |
| 2017/0106113 | A1 | 4/2017 | Meinhart | |
| 2017/0340019 | A1* | 11/2017 | Plunkett .................. | A24F 40/46 |
| 2017/0360100 | A1 | 12/2017 | Duc et al. | |
| 2019/0246696 | A1 | 8/2019 | Schmidt et al. | |

FOREIGN PATENT DOCUMENTS

| | | | | |
|---|---|---|---|---|
| EP | 2 958 443 | A1 | 12/2015 | |
| WO | WO-2015117701 | A1 * | 8/2015 | ............. A24B 15/16 |
| WO | 2016005601 | A1 | 1/2016 | |
| WO | 2018002994 | A1 | 1/2018 | |
| WO | WO-2018083007 | A1 * | 5/2018 | ............. A24F 40/46 |

* cited by examiner

AEROSOL GENERATOR

CROSS-REFERENCE TO RELATED APPLICATION

This application is the National Stage of International Application No. PCT/IB2019/054655, filed Jun. 6, 2019, which claims the benefit of U.S. Provisional Patent Application No. 62/683,991, filed Jun. 12, 2018, which is incorporated herein by reference.

FIELD OF THE INVENTION

The present invention relates generally to heat-assisted vaporizing devices, and more particularly to electrically resistive heaters for vaporizing and aerosolizing liquids to produce inhalable aerosols.

BACKGROUND

Typical power vaporizing devices and e-cigarettes designed to generate a large aerosol amount per puff typically use heating units with bulky heating bodies, resulting in intensive heating of the devices due to heat dissipation from the heating units into the surroundings. Because of the bulkiness, the units cool down slowly. This feature makes the devices hot and uncomfortable to use. In addition, the "after-use" residual heat due to the long cooling time may cause long-time chemical reactions producing toxic solutions, such as acrolein, especially in the aerosolizing liquid residing in close vicinity to the heating units. This toxic substance is then vaporized and inhaled by the consumer with the first puffs of the next puffing session.

There is a need for such an improved aerosol generator that produces dense inhalable aerosol at reduced hazardous risks and is manufactured more standardized at a low cost.

SUMMARY

Embodiments of the present invention that are described hereinbelow provide improved heating and vaporizing devices, as well as methods for their use, particularly for aerosol production.

There is therefore provided, in accordance with an embodiment of the invention, an aerosolizing device, including a reservoir configured to contain a liquid medium. A heating body includes a sheet of an electrically-conductive material having a first surface in physical contact with the liquid medium and a second surface opposite the first surface, and an array of micro-nozzles disposed over an area of the sheet and extending through the sheet from the first surface to the second surface. An electrical power unit is configured to inject pulses of electrical current through the area of the sheet, with a pulse energy selected so as to heat the conducting material sufficiently to vaporize the liquid medium and thereby cause respective jets of a vapor of the liquid medium to be ejected from the second surface of the heating body through the micro-nozzles.

The term "micro-nozzle" is used throughout the specification to refer to a hollow micro-scale channel that has a profile, in particular, varying cross-sectional area along the length, selected so as to accelerate a vapor of the liquid medium passing therethrough and thereby to give the vapor flow a given direction during the vaporization process. Due to the negative pressure introduced by the accelerated hot vapor at the ejection orifice of the micro-nozzle, a narrow-directed high-speed hot vapor jet is formed at the ejection orifice of the micro-nozzle, and the cool ambient air is drawn into the hot vapor jet from the lateral sides of the jets inducing aerosol generation when abruptly cooling the hot vapor there. The pressure decrease in the accelerated vapor can also be accompanying by the acceleration-caused temperature decrease of the vapor at the ejection orifice of the micro-nozzle, that can have additional promotional effect on the aerosol generation in addition to the cooling by the ambient air. Formation of the high-speed vapor jets that due to the pressure drop significantly promote aerosol generation, is a characteristic and essential feature introduced by the micro-nozzles. The ability of the micro-nozzles to generate dense aerosol allows reduction of the heating body size, thereby both reducing the heat dissipation-associated hazardous risks and making possible more standardized serial manufacturing of the heating body, for example, using micro-machining technologies.

In some embodiments, the device includes an air duct containing at least the second surface of the heating body, and including an air inlet, through which ambient air flows into the air duct and across the second surface, thereby forming an aerosol including the vaporized liquid medium, and an air outlet, through which the aerosol flows out of the air duct. In one embodiment, the air duct includes at least one air-nozzle arranged to form and direct a turbulent air stream onto the second surface of the sheet to promote aerosol formation.

Typically, the micro-nozzles are identical and are uniformly distributed across the area of the sheet of the conducting material.

The sheet of the electrically-conductive material may be flat or may have a curved shape. The sheet of the electrically-conductive material may include one or more of a metal, a doped semiconductor material, and an electrically-conductive foil.

In the disclosed embodiments, the sheet of the conductive material has a thickness between the first and second surfaces that is less than 1 mm, and the micro-nozzles have diameters that are less than 0.2 mm.

In one embodiment, the micro-nozzles have a truncated conical shape. In another embodiment, the micro-nozzles are Laval nozzles. The micro-nozzles may be punched through the sheet of the electrically-conductive material and protrude outward from the second surface. Alternatively, the micro-nozzles may be etched through the sheet of the electrically-conductive material and be flush with the second surface.

In some embodiments, the reservoir includes a porous medium, which is saturated with the liquid medium. In a disclosed embodiment, the porous medium is attached to the first surface of the sheet and has a liquid passage rate exceeding 3 $\mu l/mm^2 \cdot s$. Additionally or alternatively, the porous medium includes a hydrophilic fibrous material, which may be included in a layer having a thickness in the range of 0.1 mm to 1 mm.

In some embodiments, the heating body includes a plurality of electrical contacts disposed on the sheet of the electrically-conductive material on opposing sides of the array of the micro-nozzles, and the electrical power unit includes springing leads connected to the electrical contacts for injection of the electrical current therethrough. In one embodiment, the electrical contacts include micro-shapes formed on at least one of the surfaces of the electrically-conductive material, and the leads are clamped against the micro-shapes. Alternatively, the electrical contacts include one or more cutouts formed on at least one of the surfaces of the electrically-conductive material, and the leads have a cylindrical shape, which engages the one or more cutouts.

In a disclosed embodiment, at least the heating body is replaceable.

In some embodiments, the heating body is arranged and the electrical power unit is configured so that a temperature of the liquid medium that is in contact with the first surface of the sheet of the electrically-conductive material in the heating body rises above a boiling point of the liquid medium during the pulses and falls below the boiling point during the delay between the pulses in a sequence of the pulses applied by the electrical power unit to the heating body. In one embodiment, the electrical power unit includes a temperature sensor and is configured to control at least one parameter of the sequence of the pulses responsively to an output of the temperature sensor.

In a disclosed embodiment, the electrical power unit includes a pulse generator circuit and an isolation transformer, which couples the pulse generator circuit to the heating body.

There is also provided, in accordance with an embodiment of the invention, a method for aerosol generation, which includes providing a heating body including a sheet of an electrically-conductive material with having opposing first and second surfaces, and including an array of micro-nozzles disposed over an area of the sheet and extending through the sheet from the first surface to the second surface. A liquid medium is brought into engagement with the first surface of the heating body. Pulses of electrical current are injected through the area of the sheet, with a pulse energy selected so as to heat the conducting material sufficiently to vaporize the liquid medium and thereby cause respective jets of a vapor of the liquid medium to be ejected from the second surface of the heating body through the micro-nozzles.

In a disclosed embodiment, bringing the liquid medium into engagement includes filling a reservoir with the liquid medium, and delivering the liquid medium from the reservoir to the first surface of the heating body.

The present invention will be more fully understood from the following detailed description of the embodiments thereof, taken together with the drawings in which:

DETAILED DESCRIPTION OF EMBODIMENTS

Figure 1:
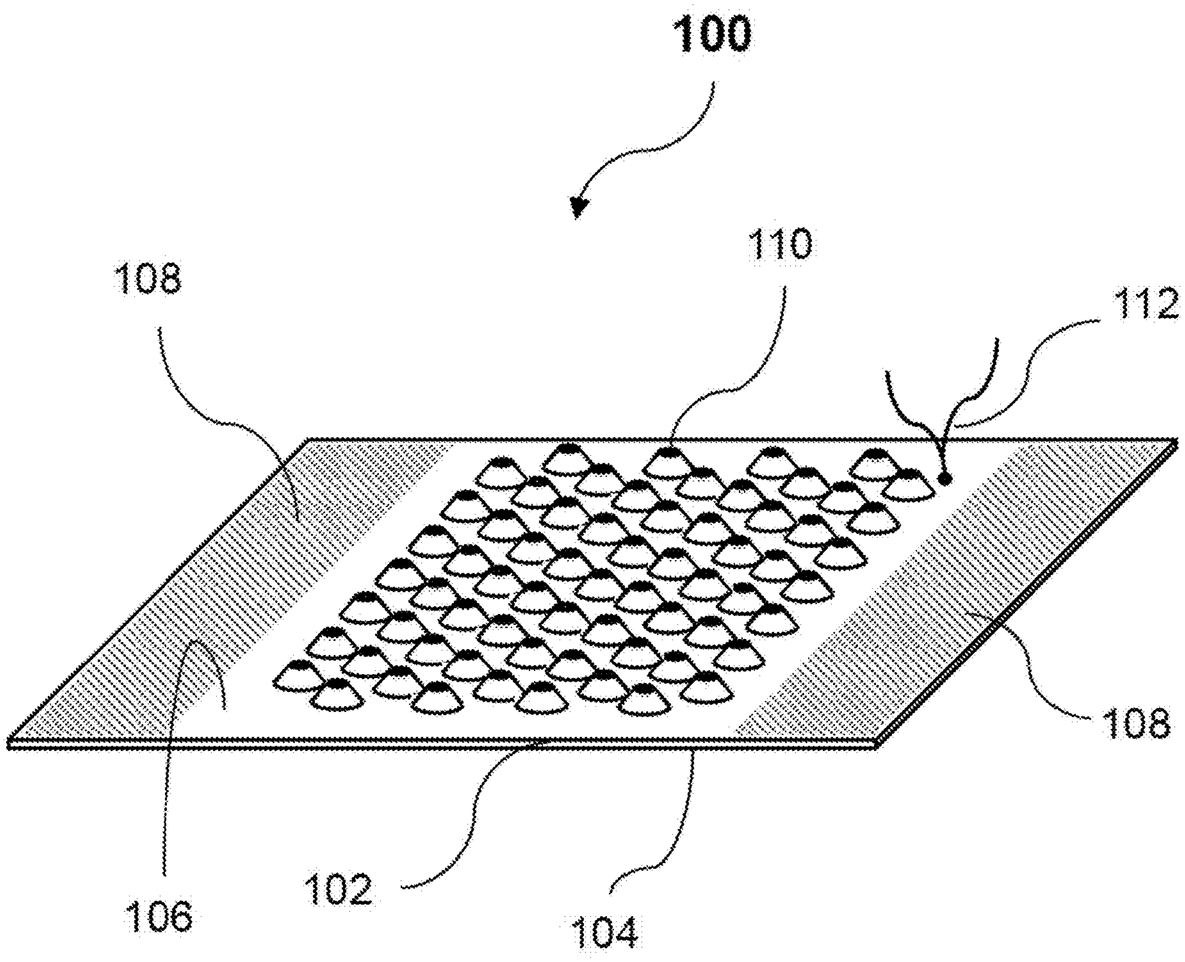
FIG. 1 is a perspective schematic view of a heating body with a plurality of micro-nozzles, in accordance with an embodiment of the invention.

For safe and comfortable e-cigarettes and similar vaporizing devices, it would be beneficial to have an alternative system and method allowing high density aerosol generation at significantly reduced hazardous risk levels, while allowing more standardized manufacturing at a lower cost.

In response to this need, embodiments of the present invention provide a heating system for aerosol generation, which comprises a thin, conductive heating body, a plurality of narrow micro-nozzles for liquid vaporization and vapor acceleration in the heating body, and non-adiabatic electrical contacts on the body for electrical power supply. The heating body and micro-nozzles are designed for fast thermal relaxation. The elements of the system are arranged, shaped and configured to provide a vaporizing device capable of fast, repeated heating and fast thermal relaxation.

In some embodiments, a liquid medium (such as an e-cigarette liquid) disposed at the entrance to the micro-nozzles of the hot heating body is first rapidly vaporized there to produced saturated vapors in each heating cycle. The vapors are then accelerated by the micro-nozzles and released in the form of high-speed hot gaseous jets into the ambient air. The jets are abruptly cooled when mixing with the ambient air to provide a sequence of aerosol portions, which are accumulated into a puff. The higher is the vapor jet speed and degree of supersaturation, the more concentrated is the aerosol.

After each pulse of vaporization, the heating body cools rapidly to allow a new portion of liquid to refill the area at the entrance of the micro-nozzles until the cycle is repeated. In this way the device is able to produce sequences of discrete, intensive aerosol puffs in response to trains of short, high-power electrical pulses. Such pulsed operation of the heating body gives rise to only low heat dissipation into the surroundings, in contrast to continuous heating, thus protecting the surroundings from overheating.

The disclosed system includes, but is not limited to, a heating system for liquid vaporization having at least one electrical heating conductor specifically arranged for pulsed operation. The conductor is formed as a two-sided body, configured for fast thermal relaxation, with electrical contact areas on the body, and with a plurality of through micro-nozzles in the body, also configured for fast thermal relaxation, having liquid injection orifices at one side and ejection orifices at the other side of the body to vaporize liquid and form vapor jets.

In some embodiments of the invention, an aerosolizing device comprises a reservoir, which may include a liquid storage tank, liquid transport wicks, and/or other components containing and sourcing a liquid medium, and a two-sided heating body comprising a thin sheet of an electrically-conductive material, which is capable of fast, repetitive heating. The heating body has a first surface, on a first side of the body, that is in physical contact with the liquid medium and a second surface on the second side of the body, opposite the first surface. An array of narrow micro-nozzles, which are also capable of fast repetitive heating, is disposed over an area of the sheet and extends through the sheet from the first surface to the second surface. An electrical power unit generates and injects pulses of electrical current through the area of the sheet, with a pulse duration and energy selected so as to heat the conducting material sufficiently to vaporize the liquid medium and thereby cause respective jets of vapor of the liquid medium to be ejected from the second side of the heating body through the micro-nozzles.

In a disclosed embodiment, the reservoir comprises a porous medium, such as a glass microfiber medium, which is saturated with the liquid medium, for example, supplying liquid medium from a tank and in physical contact with the first surface of the sheet of electrically-conductive material.

In one embodiment, at least the second side of the heating body is contained in an air duct comprising an air inlet, through which ambient air flows into the airway duct and across the second side, thereby forming an aerosol comprising the vaporized liquid medium. The aerosol flows out of the air duct through an air outlet. The air flow in the duct can be initiated by a pressure drop between the input and output created, for example, by a vape puff. The more intensively is the air mixed with the saturated vapors, the denser is the aerosol. In another embodiment, the air duct contains specially-formed air-nozzles for producing air turbulence above the heating body for advanced vapor mixing and promotion of aerosol formation.

The electrically-conductive body may be flat or have a curved shape, and may comprise a sheet of metal of a suitable form or a doped semiconductor material, for example. Typically, the body is formed of a sheet of conductive material having a dimension between the first and second sides that is less than about 1 mm. The micro-nozzles have respective lengths that are equal to the body dimension and diameters that are less than about 0.2 mm. These dimensions enable them to instantly respond to repetitive heating pulses having durations and inter-pulse delay times shorter than 100 ms. The sheet may be thinner than the dimension of the body between the first and second sides, for example less than 0.5 mm or less than 0.3 mm or even less than 0.05 mm. In this case the micro-nozzles are formed in such a way as to protrude from the sheet surface at the second side of the body. The micro-nozzle diameter is defined by the thermodynamics of the liquid heating and cooling processes inside and thus can be wider or narrower than the sheet thickness.

In some embodiments, the micro-nozzles have a truncated conical shape. Alternatively, the micro-nozzles may be Laval nozzles. In either case, the micro-nozzles may be punched through the sheet of the electrically-conductive material (and thus protrude outward from the second surface) or may be etched through the sheet of the electrically-conductive material (so that they are flush with the second surface). The etching and punching can be also performed by laser perforation.

It is advantageous that each of the micro-nozzle include an injection orifice and vapor-accelerating segment to produce discrete sub- or possibly even supersonic jets of hot saturated vapor coherently with each pulse of the electrical current pulse train. The injection orifice of the micro-nozzle has a profile favoring the collection, movement and acceleration of the liquid vapors toward the ejection orifice. It is further advantageous that the plurality of the micro-nozzles be arranged as an array of uniformly-distributed identical micro-nozzles, thus contributing into uniform heating.

It is further advantageous that the conductive heating body with its micro-nozzles and contact areas be arranged and formed in a shape with fast thermal response, thus allowing its temperature to cycle above and below the boiling point of the liquid medium coherently with each pulse and the inter-pulse delay of the electrical pulse trains applied during each puff. Typically, the conductor body is made of thermo-mechanically stable material, which is resistant to thermal shocks, thermo-mechanical fatigue and microcracking.

In one possible embodiment the heating body is flat, formed as a thin sheet or plate of electrically-conductive material with the micro-nozzles lying in the plane of the plate, with first and second sides formed by one pair of the plate edges and electrical contact areas located on another pair of the plate edges.

In another possible embodiment, the heating body is tubular and formed as an electrically-conductive thin-walled tube or thin sheet curved into a cylindrical shape, with the micro-nozzles pointing radially in or out of the cylinder. The contact areas are formed at the edges of the cylinder.

In a further embodiment the heating body is formed as a thin plate with the micro-nozzles lying across or perpendicular to the plane of the plate.

In some embodiments, the heating body comprises electrical contacts disposed on the sheet of electrically-conductive material on opposing sides of the array of micro-nozzles, and the electrical power unit comprises leads connected to inject the electrical current through the electrical contacts. In one embodiment, the electrical contacts comprise non-adiabatic micro-shapes formed to dissipate heat released by the contact resistance during each pulse on at least one of the surfaces of the electrically-conductive material, and the leads are clamped against the micro-shapes. In another embodiment, the electrical contacts comprise one or more cutouts formed on at least one of the surfaces of the electrically-conductive material, and the leads have a cylindrical shape, which engages the one or more cutouts. The leads form a narrow strip-like interface with the contact areas and may also involve non-adiabatic micro-shapes. The interface may be formed by bonding or clamping the leads with even pressure against the contact area.

As noted earlier, the electrical power unit typically applies the pulses to the heating body in a sequence with a pulse duration and a delay between pulses selected so that a temperature of the liquid medium that is in contact with the first surface of the sheet of the conducting material rises above the boiling point of the liquid medium during the pulses and falls below the boiling point during the delay between pulses. In one embodiment, the electrical power unit comprises a temperature sensor that has a fast response and is configured to measure temperature changes instantaneously. The electrical power unit controls parameters of the sequence of the pulses, such as pulse power magnitude, duration and the inter-pulse interval, in response to the output of the temperature sensor. In another embodiment a simple temperature sensor with long response time can be used to control mean power during a puff.

In some embodiments, the electrical power unit comprises a battery, for example a lithium battery. In other embodiments, the pulse generator circuit in the electrical power unit may be coupled by an isolation transformer to the heating body, in order to protect the user from possible electric shock, for example in cases of mains supply.

In some embodiments, a layer of a porous medium, which is saturated with the liquid medium, is in physical contact with the first side of the heating body, with the porous medium partially filling the injection orifices of the micro-nozzles. In other embodiments, the layer of porous medium is continuously supplied with the liquid medium from a liquid storage tank via fluidic connection means, for example, fiber glass bundles. All the components containing the liquid medium thus constitute a liquid reservoir. The layer of the porous medium at the interface with the heating body sources the liquid medium to the heating body during each pulse of heating. In further embodiments the layer of the porous medium may also be immersed in the liquid storage tank. To suppress fluidic communication between the neighboring micro-nozzles, the pores of the medium are much smaller than the injecting orifices of the micro-nozzle. The thickness of the porous medium is typically much greater than the thermal diffusion length in the liquid medium, so that a sufficient amount of the liquid can be sourced by the layer of the porous medium for vaporization during the heating pulse.

Some embodiments may involve a replaceable unit comprising at least a heating body and/or a liquid storage tank. The replaceable unit may also be arranged in the form of a disposable cartridge comprising a liquid storage tank, porous medium, leads, and electrical interface, for example, for disposable use.

In some example embodiments, the heating body with the micro-nozzles and contact areas can be produced using silicon micro-machining.

In other embodiments, the heating body is formed of foil of electrically-conductive heat-stable material, such as, for example, metals, alloys, or heavily doped semiconductors, for example, silicon. The foil may be clamped, for example, by springing leads, and stretched across the area of the liquid-saturated porous medium.

In some embodiments, the reservoir and heating body are enclosed in a housing, which includes at least one air duct (also referred to as an airway) for providing air to the heating body, transporting vapors and aerosols away from the heating body, and removing heat from the device. As noted above, the heating body, including the micro-nozzles and the contact areas, has a fast thermal response, allowing it to cycle above and below the liquid boiling point coherently with the electrical pulses and inter-pulse delay of the pulse trains applied during each puff. The device can include an electrical power unit connected to the conductor at the electrical contact areas, with an electrical control unit for controlling the output pulse parameters.

FIG. 1 is a perspective schematic view of a heating body 100, in accordance with an embodiment of the invention. Heating body 100 comprises a sheet 102 of a conductive material, having a first surface 104 for interfacing with an aerosolizing liquid medium and a second surface 106 for interfacing with ambient air. A pair of electric contact areas

108 on the sheet 102 pass an electrical current through an area of the sheet in which an array of micro-nozzles 110 is formed.

The micro-nozzles 110 serve to increase the velocity of the expanding vapors produced by vaporization of a liquid medium that is in contact with the first surface 104. Since the micro-nozzles 110 are located within the sheet 102, the heat transferred from the sheet 102 by conduction, radiation and convection can heat the liquid medium at the first surface 104, and vaporize it in the micro-nozzles 110 to produce supersaturated vapors, which are accelerated by the micro-nozzles 110 and released into the ambient air at the second side 106 in the form of high speed vapor jets. Aerosol is formed due to the abrupt cooling of the hot saturated vapors of the liquid medium through collision with cool air above the heating body 100 at each puff. The vapor particles and molecules lose their kinetic energy and coagulate into larger droplets, which thus constitute aerosol. The higher the degree of supersaturation and the faster the vapor cooling, the denser will be the aerosol and the smaller the aerosol particles.

The sheet 102 can be made of a thermo-mechanically stable electrically conductive material, such as metals, alloys, heavily-doped low-resistivity semiconductors, for example n-type or p-type monocrystalline, polycrystalline or amorphous silicon, or conductive glasses, ceramics, composites or other materials having electrical resistivity not exceeding about 0.01 Ω·cm and stability against thermal shock.

Figure 2A:
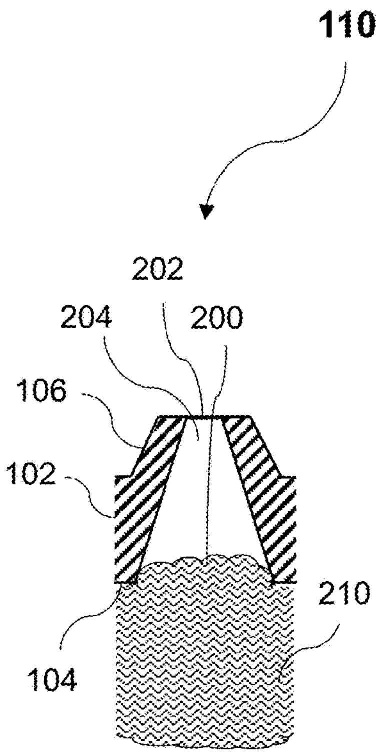
FIGS. 2A, 2B and 2C are schematic side views of micro-nozzles and a liquid-saturated medium, in accordance with embodiments of the invention.
Figure 2B:
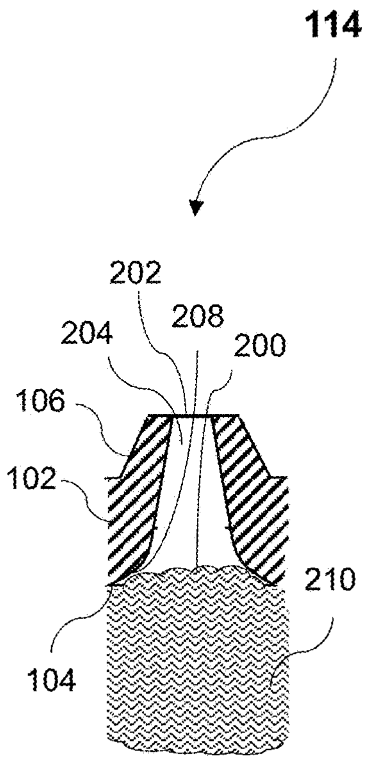
Figure 2C:
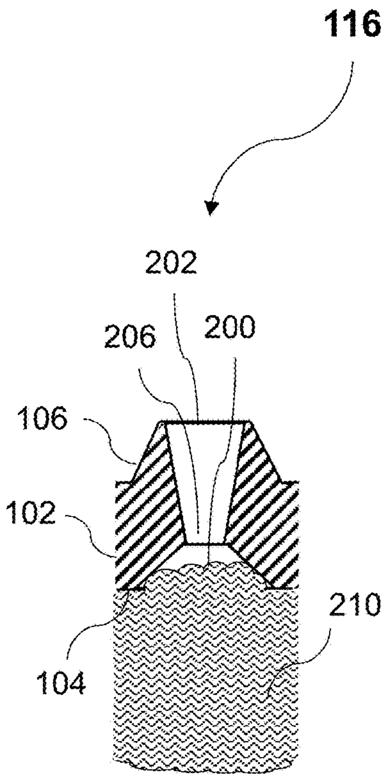

FIGS. 2A, 2B and 2C are schematic side views of micro-nozzles 110, 114 and 116, respectively, and a liquid-saturated fibrous porous medium 210, in accordance with embodiments of the invention. Each micro-nozzle has a liquid injection orifice 200 at the first surface 104 and a vapor ejection orifice 202 at the second surface 106 of the sheet 102. The cross-sections of the micro-nozzles 110, 114 and 116 can be circular, rectangular or square. The first surface 104 with the liquid injection orifice 200 is in physical contact with the liquid medium that is bound against leakage under ambient conditions by the fibrous porous medium 210 due to capillary forces.

The sheet 102 heats the liquid by heat transfer to a temperature above the boiling point at the area of injection orifice 200, allowing passage of the liquid-vapor phase into the micro-nozzle 110, 114, 116 and its complete vaporization into supersaturated vapors by the heat transferred from the sheet 102. The vapor ejection orifice 202 promotes release of the expanding vapors in the form of a jet into the ambient air. To promote acceleration of the naturally expanding hot vapors in the direction from the liquid-filled injection orifice 200 to free ejection orifice 202, the micro-nozzles 110 and 114 are arranged as hollow truncated cones 204, in which the liquid injection orifice 200 is formed by the base of the truncated cone 204 and the ejection orifice 202 is formed by the head of the truncated cone 204. In the micro-nozzle 116, a highly accelerated supersonic vapor jet may be created by a Laval-type shape 206 of the micro-nozzle 116.

Regardless of the nozzle shape, the plurality of the micro-nozzles is arranged as an array of identical micro-nozzles 110 uniformly distributed in the conductive sheet 102, for example in a rectangular form in between the contact areas 108, as shown in FIG. 1, so that the current density in the array area of the conductive sheet is also distributed uniformly.

In the embodiment shown in FIG. 2B, the micro-nozzle 114 is shaped at its liquid injection orifice 200 to form a short truncated cone-like interface section 208, which enlarges the liquid vaporization area and promotes collection of vapors from the first surface 104 and inclined interface section 208 into the micro-nozzle 114 for generation of larger amounts of vapors. In another embodiment of this type, the aperture and apex angle of the cone may be gradually changed along its axis from 90° at orifice 200 to 0° at orifice 202.

The conductive sheet 102, electrical contact areas 108, and micro-nozzles 110 (or 114 or 116) of the heating body 100 are arranged to allow the heating body 100 to form aerosol in discrete portions. The sheet 102 has fast thermal response and low inductance and is made of a material with high thermal diffusivity $\alpha_M$. The temperature of the heating body 100 is thus able to respond instantly to a train of short electrical current pulses of time duration $\tau$ and inter-pulse time delay $\delta$, in total constituting a puff-time duration T, by abruptly rising above the liquid boiling point $T_B$ during each of the electrical current pulses and falling below the liquid boiling point $T_B$ during the inter-pulse time delay.

In some embodiments, the material of the sheet 102 has thermal diffusivity coefficient $\alpha$ sufficiently high so that for the thickness $H_B$ of sheet 102, the condition $H_B \ll \pi\sqrt{\alpha_M \tau}$ is satisfied. Table 1 below lists examples of embodiments with the calculated upper limit of the thickness $H_B$ of the sheet 102, for different materials and values of pulse time duration $\tau$.

TABLE 1

| Material | $\alpha_M$, mm²/s | $\tau$, ms | $\pi\sqrt{\alpha_M \tau}$, mm | $H_B$, mm |
|---|---|---|---|---|
| Silicon | 88 | 0.1 | 0.3 | <0.03 |
| | | 1 | 0.93 | <0.093 |
| | | 10 | 2.95 | <0.295 |
| Steel, NiCr | 4.2 | 0.1 | 0.064 | <0.0064 |
| | | 1 | 0.2 | <0.02 |
| | | 10 | 0.64 | <0.064 |

For pulse time durations $\tau$ of about 1 ms to 10 ms, the sheet 102 can be made from silicon wafers or metallic foils that are thin enough to respond to power pulses with large temperature swings. For shorter pulse time duration $\tau$ of about 0.1 ms to 1 ms, both silicon and metallic foils may be adequate. In these embodiments, the distance or wall thickness between the micro-nozzles 110 is advantageously not too small, for example not less than the limit $\pi\sqrt{\alpha_M \tau}$, in order not only to avoid narrow high resistive pathways for the current, but also to fast thermal redistribution and relaxation over the heating body 100 over the time of pulse duration $\tau$.

Figure 3A:
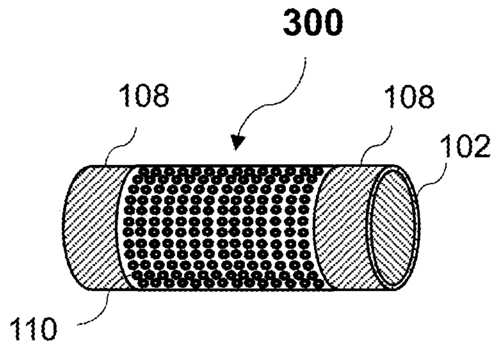
FIG. 3A is a schematic perspective view of a cylindrical heating body with cylindrical contact areas, in accordance with an embodiment of the invention.

FIG. 3A shows a heating body 300 that has a cylindrical geometry of the sheet 102 and radial micro-nozzles 110. The electrical contact areas 108 are located on the pair of circular edges of the sheet 102. This embodiment can have two versions: In one version the first surface 104 is the outer side while the second surface 106 is the inner side of the cylindrical sheet 102. In the other version the first surface 104 is the inner side while the second surface 106 is the outer side of the cylindrical body 102.

Figure 3B:
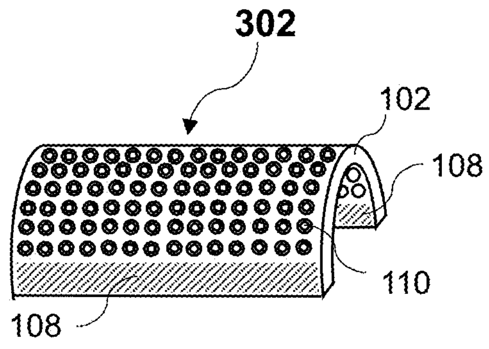
FIG. 3B is a schematic perspective view of a curved heating body with flat contact areas, in accordance with an embodiment of the invention.

FIG. 3B shows another heating body 302 that has a curved geometry of the sheet 102 and radial micro-nozzles 110 in which the electrical contact areas 108 are located on the pair of the flat edges of the sheet 102

Figure 3C:
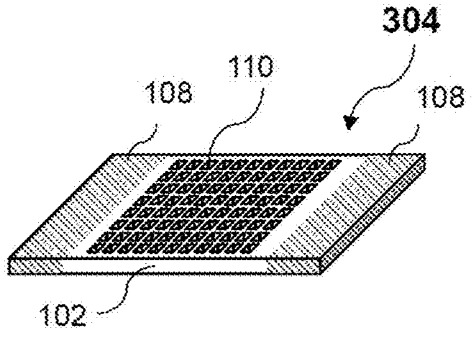
FIG. 3C is a schematic perspective view of a flat heating body with etched micro-nozzles, in accordance with an embodiment of the invention.

As in FIG. 1, FIG. 3C shows a heating body that has a flat geometry of the sheet 102 and through micro-nozzles 110 normal to the plane of the sheet 102 in which the electrical contact areas 108 are located on a pair of the flat edges of the body 102. In this embodiment, however the micro-nozzles 110 are etched through the sheet 102, rather than punched, for example, as may be done in the preceding embodiments.

Depending on the material, the sheet 102 can be formed in different ways to fabricate the heating body. For example, the sheet 102 in the heating bodies 100, 300 and 302 can be produced by micro-forming or micro-punching of thin metallic foil strips. Due to the natural plasticity of metals, the micro-nozzles 110 will be formed at each punch. The sheet 102 in the heating bodies 300 and 302 can then be rolled into a curved geometry and cut to the desired size. In the heating body 304, the sheet 102 can be made from a plate or other substrate of a metallic or semiconductor material, such as silicon, using micro-machining technologies, for example photo-etching or photolithography, followed by etching of the materials, in particular deep reactive-ion etching of the semiconductor materials, to form through micro-cavities in the sheet 102. The micro-cavities can be formed in the shape of the micro-nozzles 110 by controlling in-process parameters related to anisotropy and etching rate.

Alternatively laser micro-perforation, micro-punching or micro-etching, for example by ultrashort pulsed lasers, can be used to produce the micro-nozzles 110 in semiconductor substrates, metallic foils, or glass or ceramic materials. For metals, micro-erosion or other electrochemical and micro-machining technologies can alternatively be used. Alternatively, certain materials can be extruded and fused into a multi-capillary rod, which then be transversely cut into multi-micro-cavity plates.

Figure 3D:
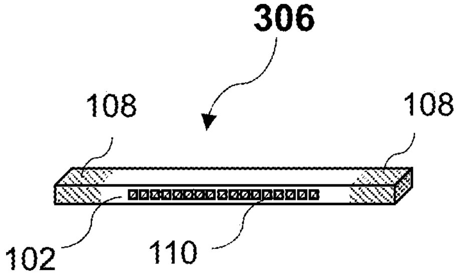
FIG. 3D is a schematic perspective view of a flat heating body with longitudinal micro-nozzles, in accordance with an embodiment of the invention.

FIG. 3D shows a heating body 306 that has longitudinal micro-nozzles 110 in the plane of the flat sheet 102 and the electrical contact areas 108 located on a pair of the plate edges not having orifices of the micro-nozzles 110. The heating body 306 can be fabricated from two metallic or semiconductor, for example silicon, plates or wafers that are first micromachined, and then clamped and bonded together.

In some embodiments, each of the micro-nozzles 110 has its maximal diameter $D_N$ defined by the conditions $D_N \leq 2\pi\sqrt{\alpha_L \tau}$ and $D_N \sim 2\pi\sqrt{\alpha_L \delta}$, where $\alpha_L$ is the thermal diffusivity of the liquid or vapors. Table 2 below lists examples of embodiments with the calculated upper limit of the diameter $D_N$ of the micro-nozzles 110 for a representative example of glycerol as the liquid and different values of pulse time duration $\tau$:

TABLE 2

| Liquid | $\alpha_L$, mm²/s | $\tau$, ms | $2\pi\sqrt{\alpha_M \tau}$, mm | $D_N$, mm |
|---|---|---|---|---|
| Glycerol | 0.1 | 0.1 | 0.02 | ≤0.02 |
| | | 1 | 0.062 | ≤0.093 |
| | | 10 | 0.198 | ≤0.2 |

For pulse time durations $\tau$ of, for example, about 1 ms to 10 ms, the micro-nozzles 110 may have diameters of about 0.05 to 0.1 mm.

In some embodiments, the heating system can have a sensing element 112, for example a temperature sensor, arranged on or in the sheet 102, for example, in one of the micro-nozzles 110, as shown in FIG. 1. The sensor 112 can be used in controlling process parameters, for example the temperature of the sheet 102. In order to ensure sensing of peak values, the sensor 112 can be shaped for fast thermal response to provide adequate sensing resolution during the pulse time duration $\tau$ and time delay $\delta$. Depending on the material and dimensions of the sheet 102, in some embodiments the sensor 112 can comprise a thermocouple, possibly using the thermoelectric effect in a junction with the material of the sheet 102. In other embodiments, the sensor 112 can comprise a glass-encapsulated thermistor. In another embodiment, the sensor 112 can comprise a thin-film resistance and/or silicon bandgap temperature sensor, deposited as a thin layer on the sheet 102. Alternatively, thermoelements, for example, formed by the thermoelectric effect in the interface between the semiconductor and metallic leads, can be used for temperature sensing.

Figure 4A:
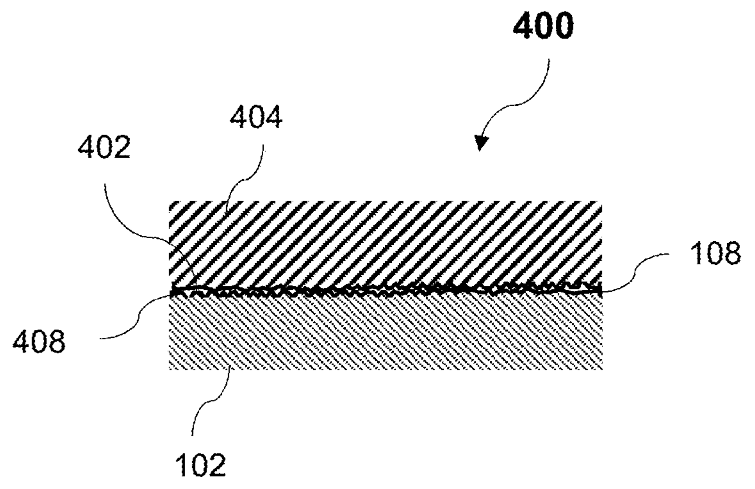
FIG. 4A is a schematic side view of a rough pulsed contact interface, in accordance with an embodiment of the invention.

In some embodiments, the electrical contact is accomplished by electro-mechanical springing clamps. For example, FIG. 4A shows an electrical contact 400 in which a contact interface 402 occurs at distributed micro-shapes, such as micro-spots 408, of the surface irregularity due to either natural or artificial roughness at the interface between the contact area 108 of the sheet 102 and leads 404. Contact area 108 has low electrical impedance, fast thermal response, and high thermal shock resistance, so that interface 402 reaches thermal equilibrium quickly by fast dissipation of transient heat from the micro-spots 408 of the contact interface 402 upon passage of short high-power electrical pulses. To ensure the contact area 108 against local arcing and overheating, the micro-spots 408 of the contact interface 402 are uniformly distributed over the contact area 108. In one embodiment, the micro-spots 408 of the interface 402 have diameter $D_I$ satisfying the conditions $D_I \ll \sqrt{\alpha_M \tau}$ and $D_I \ll \sqrt{\alpha_M \delta}$, and are distributed so that the distance Δ between neighboring micro-spots of the interface 402 satisfies the condition $\Delta \gg D_I$.

Figure 4B:
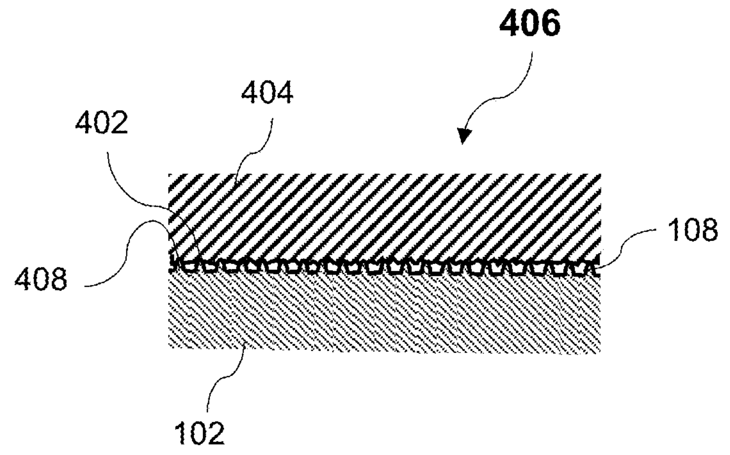
FIG. 4B is a schematic side view of a structured pulsed contact interface, in accordance with an embodiment of the invention.

In another embodiment, in an electrical contact 406, shown in FIG. 4B, the interface 402 between the leads 404 and contact area 108 can comprise a plurality, for example an array, of micro-spots 408 of predetermined diameter $D_I$ and inter-spot distance Δ. The micro-spots are provided by artificially made micro-shapes, for example, spherical or conical micro-shapes etched into the surface of the sheet 102, satisfying the conditions $D_I \ll \sqrt{\alpha_M \tau}$, $D_I \ll \sqrt{\alpha_M \delta}$ and $\Delta > D_I$. The number of the micro-spots 408 in the interface 402 in contacts 400 and 406 can be as high as necessary to redistribute the contribution of contact resistance to the peak temperature rise at each micro-spot at each pulse.

Table 3 below lists examples of embodiments with the calculated upper limit of the micro-spot diameter $D_I$ for a representative example of gold-coated copper and silicon surfaces and different values of pulse time duration τ.

TABLE 3

| Material | $\alpha_M$, mm$^2$/s | τ, ms | $\sqrt{\alpha_M \tau}$, mm | $D_I$, mm | Δ, mm |
|---|---|---|---|---|---|
| Gold coated | 111 | 0.1 | 0.105 | <0.01 | >0.01 |
| Copper | | 1 | 0.333 | <0.03 | >0.03 |
| | | 10 | 1.05 | <0.1 | >0.1 |
| Silicon | 88 | 0.1 | 0.09 | <0.01 | >0.01 |
| | | 1 | 0.297 | <0.03 | >0.03 |
| | | 10 | 0.938 | <0.1 | >0.1 |

For pulse durations τ of, for example, about 1 ms to 10 ms the diameters $D_I$ of the micro-spots 408 can be in a range of about 0.01 to 0.03 mm.

Figure 5A:
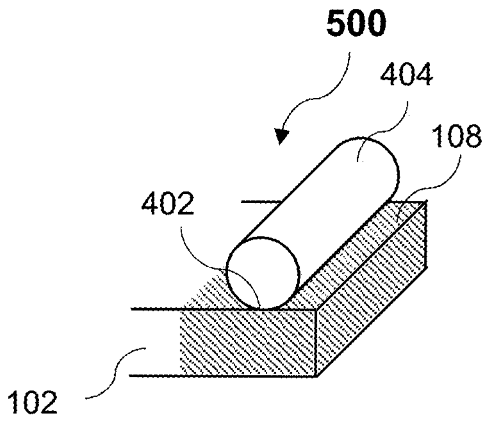
FIG. 5A is a schematic perspective view of a strip-like electrical interface of a clamping electrical contact, in accordance with an embodiment of the invention.

FIG. 5A shows an electrical contact 500 in which the interface 402 between the lead 404 and the sheet 102 in the contact area 108 is arranged as at least one narrow strip, formed by the cylindrical lead 404 and the plane surface of the contact area 108.

Figure 5B:
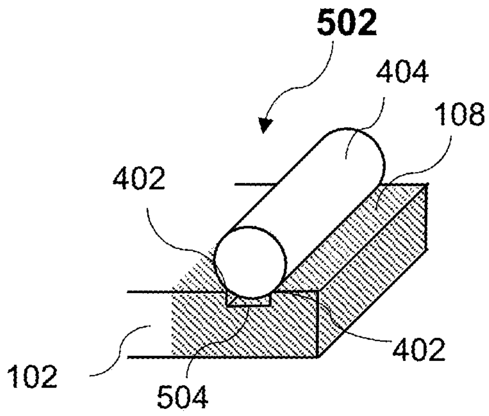
FIG. 5B is a schematic perspective view of a strip-like electrical interface, in accordance with another embodiment of the invention.

In another embodiment, shown in FIG. 5B, the contact interface 402 in a contact 502 comprises two narrow strips formed by the cylindrical lead 404 and a step-like cutout 504 in the contact area 108.

Figure 5C:
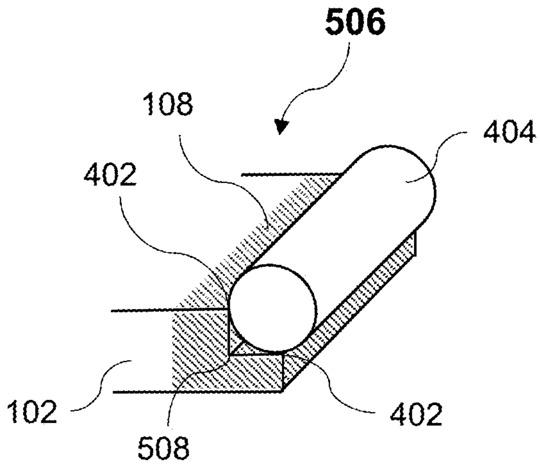
FIG. 5C is a schematic perspective view of a strip-like electrical interface, in accordance with yet another embodiment of the invention.

In a further embodiment, shown in FIG. 5C, the contact interface 402 in a contact 506 comprises two narrow strips formed by the cylindrical lead 404 and a step-like cutout 508 in the contact area 108.

In the contacts 500, 502 and 506, the narrow strips of contact interface 402 provide an electrical connection pathway for the electrical current from the leads 404 through the interface 402 into the conductive sheet 102, while reducing heat conduction from the hot sheet 102 through the interface 402 into the leads 404. The reduced heat leakage from the sheet 102 through the interface 402 contributes to uniform temperature distribution over the sheet 102 during each pulse duration τ. The narrow strip interfaces of the contacts 500, 502 and 506 can advantageously have width of the narrow strip $D_S$ satisfying the conditions $D_S \ll \sqrt{\alpha_M \tau}$ and $D_S \ll \sqrt{\alpha_M \delta}$. When there are two or more narrow strips in the interface 402, as in the contacts 502 and 506, the distance Δ between the neighboring narrow strips can advantageously satisfy the condition $\Delta > D_S$.

It is advantageous to join the leads 404 and contact area 108 by applying enough force at the interface 402 to ensure that the contact is not heated due to the contact resistance and does not arc during the pulses (which could cause oxidation and/or an open circuit after the pulses). For contact interfaces between metal pieces and between metals and heavily-doped semiconductors, the contact resistance depends on the contact pressure. For this reason, it is desirable that the contact pressure exceed 1 N/mm$^2$. Such contacts can be formed from micro-bent springing metal, for example brass, wire or micro-stamped metallic parts such as SMD contact springs formed as clamps to mechanically fix the sheet 102 while providing reliable galvanic contact at the interface 402.

In embodiments in which the interface 402 is formed by metallic leads 404 and the sheet 102 is made of a semiconductor, for example heavily-doped n-type silicon, it is desirable that the contact resistance at the interface 402 be lower than the bulk resistance of the sheet 102. Under this condition, the contact is ohmic, rather than Schottky-type, and thus allows unimpeded transfer of the majority charge carriers between the leads 404 and the semiconductor sheet 102 and does not limit the electrical current. The heavy doping of the semiconductor serves to reduce any possible Schottky barrier, converting it into an ohmic contact.

In other embodiments in which the sheet 102 is made of a low-resistivity semiconductor, the contact area 108 can undergo additional processing to reduce contact resistance of the Schottky type. One type of such processing can be electric conductivity-specific metallization by gold (Au) or copper (Cu) or a suitable multilayer. Metallized silicon wafers, which are widely available commercially, can be used for this purpose. An appropriate photolithography step, followed by a metal etching step to form the metallized contacts is added to the fabrication process of the sheet 102. Another possible way to reduce the contact resistance at the contact area 108, for example for a n-type semiconductor, is to increase sub-surface phosphorous content in the semiconductor by phosphorous diffusion from special n-type doping pastes that can be patterned through masks or stencils, like those used for SMD soldering paste deposition.

In some embodiments, as shown in FIGS. 2A-C, the liquid-saturated highly porous fibrous medium 210 is fluidically connected to an aerosolizing liquid source and placed adjacent to the first surface 104 of the sheet 102. At the interface with the first surface 104, the medium 210 partially fills the micro-nozzles 110 (or 114 or 116) to enlarge the contact area with the sheet 102, thus increasing the amount of liquid that can be vaporized. It is advantageous that the medium 210 partially fills the micro-nozzles 110 over the inclined interface 208 in order to produce more vapor.

The medium 210 has small pore size, for example less than 20 μm, in comparison with the distance between neighboring micro-nozzles 110. The small pore size suppresses free liquid communication between the micro-nozzles and reduces liquid splashing from one of the micro-nozzles 110 because of the pressure created by the bubbles formed at the liquid injection orifice 200 of the neighboring micro-nozzle 110. The decreased pore size of the medium 210 creates extra resistance to liquid flow even at high porosity.

It is desirable, particularly if the medium 210 has limited thickness, to ensure that the medium is able to supply the necessary amount of liquid for vaporization during the pulse time duration τ and, on the other hand, to refill the vaporized amount of the liquid during the inter-pulse period τ+δ. The minimal thickness $D_M$ of the medium is also limited by the heat diffusion length in the liquid of the medium 210, defined as $D_M \geq \pi\sqrt{\alpha_L \tau}$. Table 4 below lists examples of embodiments with the calculated value of the thickness $D_M$ for a representative example of glycerol in a medium 210, such as a mesh of glass fibers, with porosity close to 100% and different values of pulse time duration τ:

TABLE 4

| Liquid | $\alpha_L$, $mm^2/s$ | τ, ms | $\sqrt{\alpha_L \tau}$, mm | $D_M$, mm |
|---|---|---|---|---|
| Glycerol | 0.1 | 0.1 | 0.01 | >0.01 |
| | | 1 | 0.031 | >0.03 |
| | | 10 | 0.099 | >0.1 |

For pulse time durations τ of, for example, about 1 ms to 10 ms, the porous medium 210 desirably has a thickness exceeding 0.1 mm.

It is advantageous that the porous medium 210 have sufficient hydrophilicity with respect to the liquid medium and porosity to ensure a high rate of liquid refilling at the thickness $D_M$ during the delay time δ after each pulse of the pulse train. This characteristic is useful in avoiding Leidenfrost layer formation.

The porous hydrophilic medium 210 desirably has a porosity or void fraction of at least 70-90%, with pore diameters in the range of about 1 μm to 10 μm to promote capillary flow and fast refilling rate. The medium 210 should be stable at high temperature stable and allow liquid passage rate of at least about 3 μl/s·mm$^2$, while withstanding pressure of at least 0.3 g/mm$^2$ in order to maintain integrity in the presence of hot gases from the micro-nozzles 110. The porous medium 210 holds the liquid due to capillary forces but releases the liquid when heated by sheet 102 due to the resulting drop in the liquid viscosity and capillary forces. For these purposes, the porous medium 210 can be formed, for example, as a microfiber matrix of 0.5-1 micron thick, high-temperature stable borosilicate or quartz glass fibers, having weight on the order of 100 g/m$^2$. The microfiber matrix has thickness exceeding 0.3 mm, and mechanical stability at a pressure of 0.5 psi, similar to the glass or quartz fiber filters that are known in the art. Such filters typically have liquid flow rates higher than that of cotton. In order to avoid excessive back-pressure at high liquid passage rates, the thickness of the porous medium 210 typically does not exceed about 1 mm.

In another embodiment, the porous medium 210 can actively control the liquid supply using electrically-activated changes in the liquid viscosity and surface tension, for example by preheating or electrowetting, thus changing the capillary forces keeping the liquid in the medium 210. In this case the medium can be made of electrically-conductive glass fiber.

Figure 6:
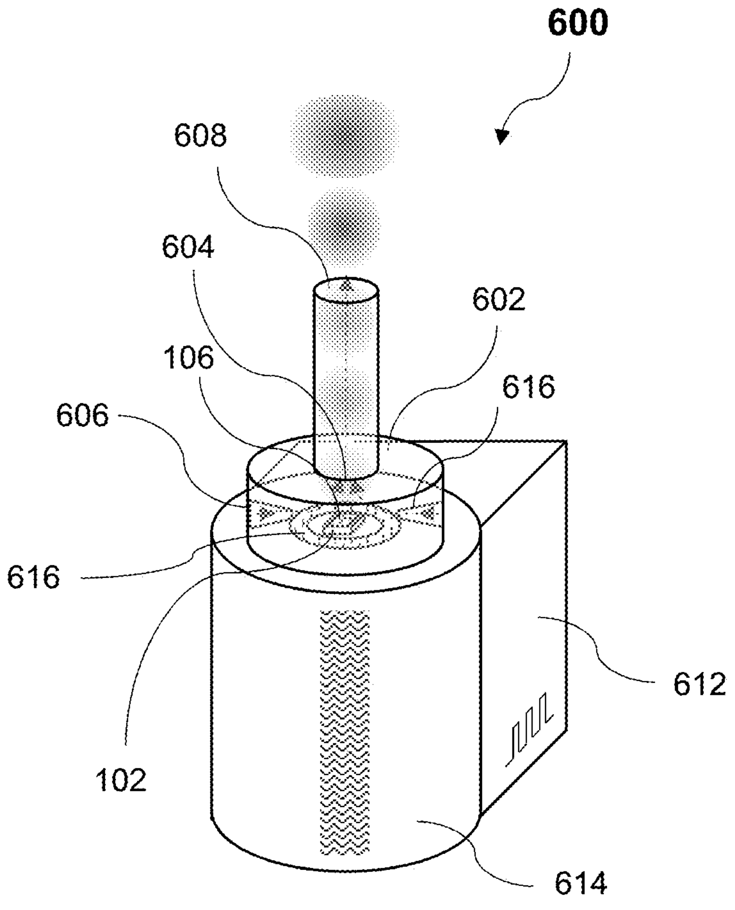
FIG. 6 is a schematic perspective view of an e-cigarette device with air-duct nozzles, in accordance with an embodiment of the invention.

FIG. 6 shows an aerosol generating device 600, for example used as an e-cigarette or a functionally-similar sort of vaping device, in accordance with an embodiment of the invention. The aerosol generating device 600 can comprise at least one heating body, for example in the form of a conductive sheet 102, as in the heating bodies 100, 300, 302, 304 or 306 described above. The sheet 102 is enclosed in a housing 602, comprising at least one air duct 604 containing the heating body. The air duct comprises at least one air inlet 606 and one air outlet 608 from the housing, providing ambient air from the inlet 606 to the conductive sheet 102. The ambient air flows over the second surface 106, promoting aerosol formation there and delivering the aerosol to the outlet 608. The air duct 604 is not necessarily separate item, but can rather be defined by one or more air-permeable parts within the housing, allowing air flow from the inlet 606 to the outlet 608.

The device 600 can further comprise a pulsed electrical power unit 612, which can comprise a battery, connected via the electrical leads 404 to the conductive sheet 102. The device 600 also comprises a liquid reservoir with a storage tank unit 614 containing an aerosolizing liquid composition fluidly connected to the heating body. In the embodiment shown in FIG. 6, the liquid source, in the form of the storage unit 614 with fluidic transport means, is located below the sheet 102. In other possible embodiments, a liquid storage unit may be integrated into the housing 602 in the form of a coaxial reservoir around the sheet 102, while the available area below the sheet 102 may be used for a battery to supply the power unit 612.

In one embodiment, the air duct 604 includes at least one air-nozzle 616 to form turbulence at the output of the air nozzle 616 and direct a turbulent air stream onto and/or over the second surface 106 of the sheet 102. This turbulent flow promotes intensive air mixing above the heating body and thus intensive aerosol formation. The air flow rate from the nozzle 616 can advantageously be higher than 1 m/s. As an example, the nozzle 616 can be made together with the plastic enclosure 602, for example using injection molding. It is desirable that the section of the air duct 604 from the sheet 102 to the outlet 608 supports laminar air flow to prevent aerosol recondensation into liquid on the walls of the air duct 604.

In some embodiments, in order to reduce residual heat flow from the heating body, the air duct 604 can include at least one heat sinking element 616, for example in the form of a pinned radiator or meandered section of the air duct 604. Heat sinking element may comprise a ceramic base with high heat conduction, connected to the sheet 102. The thermal response time of the heat sinking element can be advantageously much longer that the pulse duration time τ in order to remove residual heat without affecting the peak heating temperature.

Figure 7:
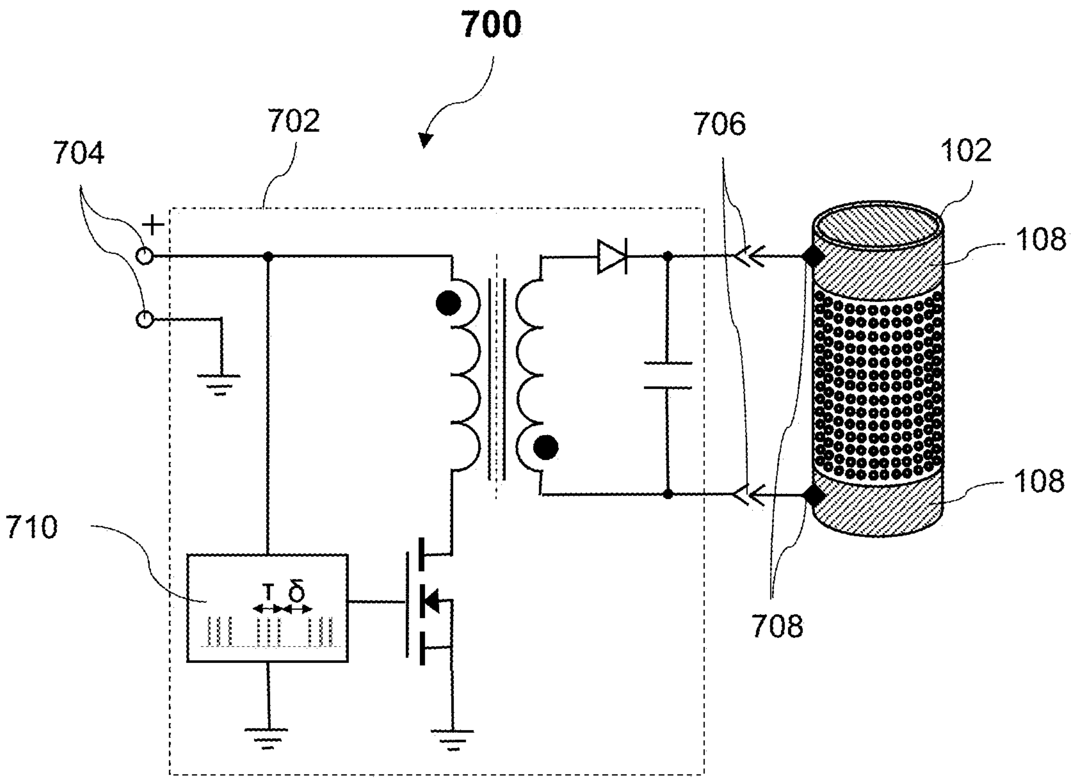
FIG. 7 is a schematic electrical diagram of an aerosol generator with a galvanically isolated output power supply, in accordance with an embodiment of the invention.

FIG. 7 is a schematic electrical diagram of the electrical power unit 612 of the device 600, in accordance with an embodiment of the invention. The power unit 612 can include a galvanically-isolating output circuit, similar to that used in medical devices. In the pictured embodiment, the power unit 612 comprises a flyback converter 702, using an isolation transformer 700 to separate an electrical output 706, which is connected via leads 708 to the conductive sheet, from the input 704, which is powered from a main supply, e.g., an AC/DC converter or power battery. The galvanically-isolated interface allows safe use of high power to generate intensive aerosol output while saving battery capacity. In order to power the heating body 102 using pulses of time duration τ and delay δ, a switching frequency controller 710 of the flyback converter 702 provides modulation of the switching frequency and duty cycle.

Figure 8A:
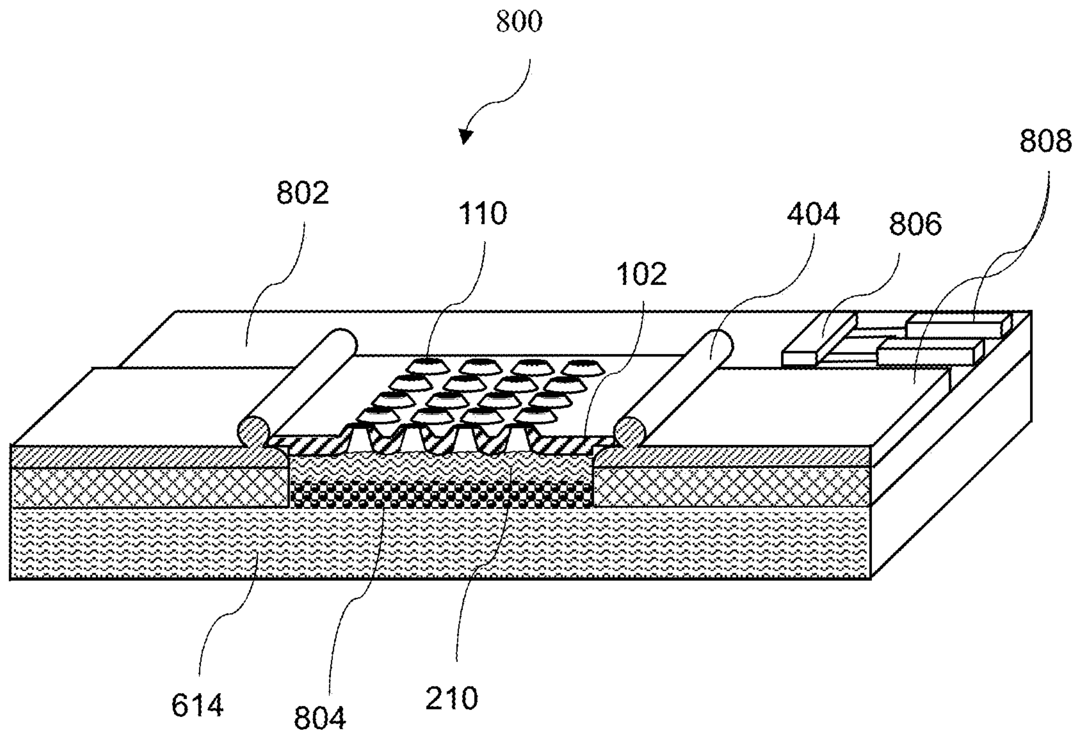
FIG. 8A is a schematic perspective view of a flat replaceable heating body, in accordance with an embodiment of the invention.

FIG. 8A shows a flat, replaceable heating body 800, comprising a flat conductive sheet 102, which can be similar to those shown in FIGS. 1 and 3C, together with the liquid-saturated porous medium 210. These elements are clamped in a substrate 802 with electrical leads 404. The replaceable heating body 800 can include a flat liquid storage tank unit 614, which can be refillable or disposable.

If the porous medium 210 is soft, for example a medium made from glass micro-fibers, it may be supported by an additional supporting grid layer 804, made of a mechanically stable hydrophilic material (with respect to the composition of the liquid medium), for example polycarbonate, polyethylene terephthalate (PET), or polyetheretherketone (PEEK), or from a ceramic, glass or composite material. The fixation of the porous medium 210 by the grid layer 804 prevents delamination of the medium 210 from the sheet 102 due to the abrupt rise in gas pressure inside the micro-nozzles 110 at each heating pulse heating.

In order to control the operational parameters, the replaceable unit 800 can include a sensor, for example, a temperature sensor 806. The substrate 802 can be a DBC (Direct Bonded Copper) substrate, with terminals 808 as in a printed circuit board. The liquid storage tank unit 614 can be injection molded from a suitable plastic.

Figure 8B:
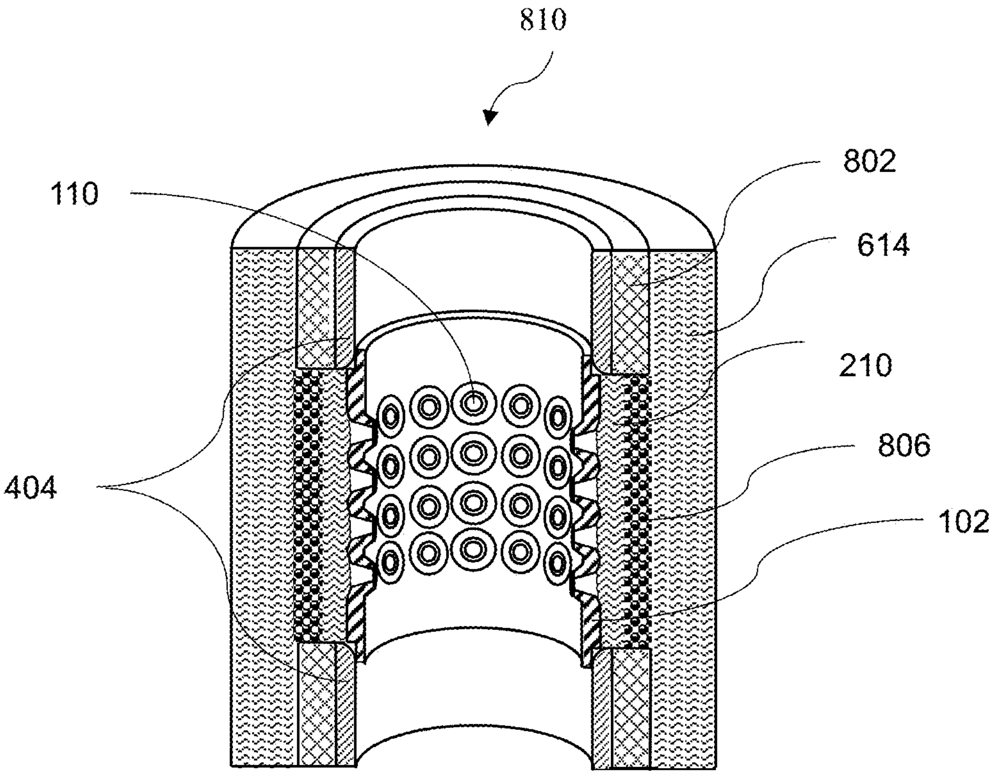
FIG. 8B is a schematic perspective view of a cylindrical replaceable heating body, in accordance with an embodiment of the invention.

FIG. 8B shows a cylindrical, replaceable heating body 810, in which the conductive sheet 102 is bent into a cylindrical form, for example as in heating body 300 shown in FIG. 3A. In this embodiment, the liquid medium is supplied from a coaxial cylindrical liquid storage tank unit 614, outside the cylindrical sheet 102, through a coaxial liquid-saturated porous medium 210 and also a coaxial supporting layer 614. The micro-nozzles 110 are arranged to create vapor jets in the inward radial direction toward the axis of the cylindrical sheet 102.

In another embodiment (not shown in the figures), the liquid storage unit, porous medium and supporting layer can be located inside a cylindrical conductive sheet, thus supplying the liquid from the inside the heating body. In this case, the micro-nozzles create vapor jets in the outward radial direction, away from the axis of the cylindrical heating body.

Figure 9:
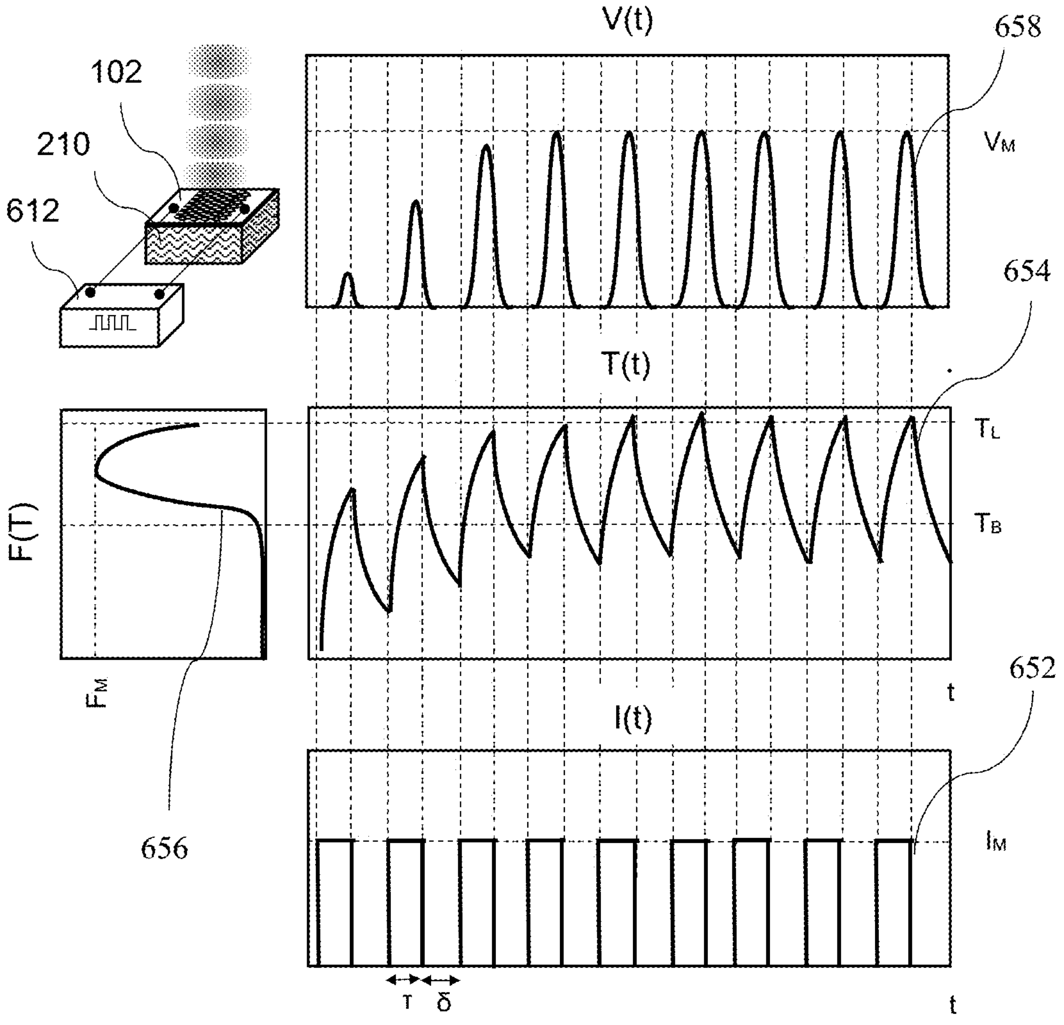
FIG. 9 is a schematic plot of pulses applied in an aerosolizing device, in accordance with an embodiment of the invention.

FIG. 9 is a schematic plot of pulses applied in an aerosolizing device, in accordance with an embodiment of the invention. To produce the aerosol, the magnitude $I_M$ of the current provided by the power unit 612 in each pulse 652, having time duration τ, is sufficiently high so that a temperature 654 of the liquid medium at the interface with the conductive sheet 102 is predominantly cycling together with the power pulses 652 in the range of the temperatures below the boiling point $T_B$ and Leidenfrost point $T_L$. In this temperature range, the liquid medium boils in the nucleate and transitional regions of a liquid boiling curve 656, thus providing the highest critical power flux F from the heating body into the liquid and the most intensive vaporization V 658 to the state of saturated vapors. The power flux that is defined by the electrical current is on the order of 1-10 W/mm$^2$, for example, in order to vaporize a layer of a glycerol based composition having a thickness of 0.01 mm to 0.1 mm over a time less than or about 10 ms. The time pulse duration τ is chosen to be sufficiently long to vaporize the heated liquid composition.

The power pulse duration τ is preset advantageously to be no longer than the time required to heat and vaporize the liquid layer adjacent to the conductive sheet, to a thickness on the order of the thermal diffusion length $D_M$ in the liquid medium or porous medium 210 defined as $D_M \sim \pi\sqrt{\alpha_L \tau}$.

It is desirable that the time delay δ between successive power pulses 652 be no shorter than the time required to refill the vaporized liquid in the area of the liquid-saturated porous medium 210 adjacent to the interface with the first surface of the conductive sheet 102, at the injection orifices 200. It is further advantageous that the time delay δ be correlated with the size $D_N$ of the micro-nozzles 110 by the condition $D_N \sim 2\pi\sqrt{\alpha_M \delta}$ in order to avoid over-cooling of the liquid in the micro-nozzles 110. For example, the time delay δ may be of the order of the pulse time duration τ.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An aerosol generator, comprising:
a reservoir configured to contain a liquid medium;
a heating body comprising a plurality of channels and an electrically-conductive sheet, the sheet having a first surface and an opposite second surface; and
an electric power unit configured to inject pulses of electric current through the sheet,
wherein the channels are disposed in the sheet and extending through the sheet from the first surface of the sheet to the opposite second surface of the sheet, and
wherein the channels are configured to provide directional flow of a vapor from the channels.

2. The aerosol generator according to claim 1,
wherein the heating body is enclosed in a housing comprising an air duct configured to remove heat by air.

3. The aerosol generator according to claim 1,
wherein the sheet comprises heavily doped low resistivity silicon.

4. The aerosol generator according to claim 1,
wherein the channels are arranged in a square or rectangular array of identical channels.

5. The aerosol generator according to claim 1,
wherein the channels have variable width along the length.

6. The aerosol generator according to claim 1,
wherein the reservoir comprises a hydrophilic porous medium attached to the first surface of the sheet and configured to suppress bubbles at the interface with the sheet.

7. The aerosol generator according to claim 6,
wherein the size of the pores of the porous medium is less than both the width of the channels and the distance between the channels.

8. The aerosol generator according to claim 6,
wherein the sheet and the porous medium are comprised in a removable unit.

9. The aerosol generator according to claim 1,
wherein the heating body further comprises a plurality of electrical contacts, the electrical contacts disposed on the sheet and having lower contact resistance than anywhere on the sheet, and the electric power unit comprises leads, the leads connected to the electrical contacts and having a cylindrical shape at the interface with the electrical contacts.

10. The aerosol generator according to claim 1,
wherein the electric power unit is configured to provide correlation of the pulse parameters with the thermal time constant of the heating body.

11. The aerosol generator according to claim 1,
further comprising an electrical control unit,
wherein the electrical control unit comprises a sensor and is configured to control the pulsed electric power responsively to an output signal of the sensor.

12. A method for aerosol generation, comprising:
providing the aerosol generator according to any one of claims 1, 2, 10, 11, 8;
bringing a liquid medium into physical contact with the first surface of the sheet; and
injecting pulses of electric current through the sheet to cause directional vapor flow from the channels, thereby producing aerosol in the ambient air.

13. The method according to claim 12 being carried out by providing the aerosol generator of claim 10,
further comprising the step of setting the pulse parameters in correlation with the thermal time constant of the heating body for pulsed operation of the heating body.

14. The method according to claim 12 being carried out by providing the aerosol generator of claim 11, further comprising the step of controlling the pulsed electric power responsively to the output signal of the sensor.

15. The method according to claim 12 being carried out by providing the aerosol generator of claim 2, further comprising the step of providing air through the air duct to remove heat.

16. The method according to claim 12 being carried out by providing the aerosol generator of claim 8, further comprising the step of removing the unit.

* * * * *